United States Patent
Hsu et al.

(10) Patent No.: US 7,974,161 B2
(45) Date of Patent: Jul. 5, 2011

(54) METHOD OF ADJUSTING GAIN BALANCE OF OPTICAL TRANSDUCER

(75) Inventors: Chia-Hsing Hsu, Taoyuan (TW); Yi-Long Hsiao, Taoyuan (TW)

(73) Assignee: Quanta Storage Inc., Taoyuan County (TW)

( * ) Notice: Subject to any disclaimer, the term of this patent is extended or adjusted under 35 U.S.C. 154(b) by 325 days.

(21) Appl. No.: 12/370,058

(22) Filed: Feb. 12, 2009

(65) Prior Publication Data
US 2009/0285060 A1 Nov. 19, 2009

(30) Foreign Application Priority Data

May 15, 2008 (TW) .............................. 97118287 A

(51) Int. Cl.
*G11B 7/00* (2006.01)
(52) U.S. Cl. ............... 369/44.35; 369/44.36; 369/53.25; 369/53.38
(58) Field of Classification Search ............... 369/44.35, 369/44.36, 53.25, 53.38
See application file for complete search history.

(56) References Cited

U.S. PATENT DOCUMENTS 7,215,607 B2 * 5/2007 Watanabe et al. .......... 369/44.29
* cited by examiner

*Primary Examiner* — Wayne R Young
*Assistant Examiner* — Brenda Bernardi
(74) *Attorney, Agent, or Firm* — Bacon & Thomas, PLLC

(57) ABSTRACT

A method of adjusting gain balance of an optical transducer includes the following steps. First, two external gains are predetermined. Next, the projection position of a reflection spot is adjusted toward one side of the optical transducer, and the current output values of the optical transducer each corresponding to one of the external gains are measured, respectively. Next, the projection position of the reflection spot is adjusted toward the other side of the optical transducer, and the current output values of the optical transducer each corresponding to one of the external gains are measured, respectively. Then, a gain balance value of the optical transducer is adjusted, and is set as the external gain. Next, the projection position of the reflection spot is adjusted. Finally, the projection position of the reflection spot, where the current output value of the transducer is equal to 0, is locked to complete the adjustment rapidly.

6 Claims, 3 Drawing Sheets

METHOD OF ADJUSTING GAIN BALANCE OF OPTICAL TRANSDUCER

This application claims the benefit of Taiwan application Serial No. 97118287, filed May 15, 2008, the subject matter of which is incorporated herein by reference.

BACKGROUND OF THE INVENTION

1. Field of the Invention

The invention relates in general to a method of adjusting gain balance of an optical transducer, and more particularly to an adjusting method of balancing the gain in an optical transducer for receiving reflected light in an optical drive.

2. Description of the Related Art

In an optical drive, a micro light spot with the diameter ranging from about 0.85 to 2.11 microns is projected onto an optical disk, and the reflected light being reflected from the optical disk is received. By making use of an electric signal which is generated according to different light amount of the reflected light, the optical drive which is servo-controlled is able to read the data on the optical disk. Because the reflection spot of the reflected light is very small, the converted electric signal is relatively weak. Therefore, the signal is needed to be amplified with a gain, and the reflection spot is needed to be projected on the receiving position in a balanced manner, so as to enhance the signal quality and reliability.

FIG. 1 (Prior Art) is a schematic illustration showing that the gain balance of the optical transducer is adjusted in a conventional optical drive 10. The conventional optical drive 10 utilizes an optical system having an optical pick-up head 11 to focus a light beam emitted from a laser photodiode 12 into the micro light spot, and to project the light beam on a rotating optical disk 13. The optical disk 13 reflects the light beam back to the optical pick-up head 11, and projects it on an optical transducer 14 to form a reflection spot 15. The optical transducer 14 is divided into a left half portion and a right half portion, which have the same size and respectively have gains G1 and G2. The left half portion and the right half portion of the optical transducer 14 each receives a portion of the reflection spot 15, and converts the corresponding luminous flux, which is induced from the reflection spot 15 being received thereon, into the current signal with corresponding level. Then, the converted weak currents are properly amplified by the gains G1 and G2, respectively, so as to facilitate the subsequent signal processing.

The optical drive 10 adjusts the gain balance of the optical transducer before the operation of tracking servo. The optical drive 10 utilizes an actuator 16 to move a set of objective lens 17, so as to adjust the position where the reflection spot 15 is projected on the optical transducer 14. When the reflection spot 15 is equally projected on the left and right half portions of the optical transducer 14, which means that the light receiving areas of the left and right half portions are the same, the difference between the received amounts of the reflected light can be thus eliminated. In this regard if we let the left and right half portions of the optical transducer 14 only have different gains on the circuit, we may also need to provide an external gain modulation device 18 with a corresponding external gain Kb. If the value of the external gain Kb can be properly used, the current signals, outputted from the left and right half portions of the optical transducer 14 after being amplified by their respective gains, can be gain-balanced. As a result, the output value, which is obtained by subtracting the current signals being gain-balanced from each other, will be equal to 0, and the optical signals of the left and right half portions will be balanced. Thereafter, when the optical disk is read/written in a tracking manner, the optical drive is servo-controlled to read the data on the optical disk according to variations of the differences between the optical signals, which are detected by the left and right half portions of the optical transducer 14.

However, the projection position of the micro reflection spot 15 being projected on the optical transducer 14 is inside the optical drive 10, so that the projection position cannot be adjusted with human eyes, and only can be judged according to the output signal. Because the different signal circuits have differences gains, the reflection spot 15 may be not projected on the middle of the optical transducer 14 after adjusting. Thus, the light receiving areas of the left and right half portions of the optical transducer 14 are not the same, and the difference of the received reflected light cannot be eliminated. Moreover, the signal levels outputted from the left and right half portions of the optical transducer 14 are relative to the difference between the light receiving areas thereof. So, in the conventional method of adjusting the gain balance of the optical transducer in the optical drive, the balance value cannot be obtained by simply calculating the external gain Kb with respect to the equation $G1*Kb=G2$ according to the gains' difference, but needs to be obtained by repeatedly adjusting and testing. In addition, due to the different light receiving areas, the obtained external gain Kb may fail in ensuring that the reflection spot 15 can be projected on the middle of the optical transducer 14. Thus, it may be not possible to correctly present the variation of the difference between the light signals detected by the two half portions of the optical transducer 14, thereby reducing the signal quality and reliability. Therefore, the conventional optical transducer still has problems to be solved in the aspect of gain balance adjustment.

SUMMARY OF THE INVENTION

The invention is directed to a method of adjusting gain balance of an optical transducer, wherein a gain balance value of the optical transducer can be calculated to adjust the gain of the optical transducer without adjusting the reflection spot to be projected on the middle position of the optical transducer.

The invention is directed to a method of adjusting gain balance of an optical transducer, wherein the reflection spot is rapidly adjusted to be projected on the middle of the optical transducer according to the calculated gain balance value of the optical transducer so that the adjusting time can be shortened.

The invention is directed to a method of adjusting gain balance of an optical transducer, wherein it is possible to ensure that the reflection spot can be adjusted to be projected on the middle of the optical transducer so that the subsequent operation of the optical drive can obtain the best signal quality and reliability.

According to the present invention, a method of adjusting gain balance of an optical transducer is provided. First, two external gains are predetermined. Next, the projection position of a reflection spot is adjusted toward one side of optical transducer, and the current output values of the optical transducer each corresponding to one of the external gains are measured, respectively. Then, the projection position of the reflection spot is adjusted toward the other side of the optical transducer, and the current output values of the optical transducer each corresponding to one of the external gains are measured, respectively. Next, a gain balance value of the optical transducer is calculated, and the gain balance value is set as the external gain. Then, the projection position of the reflection spot which is projected on the optical transducer is adjusted. Next, the projection position of the reflection spot is locked when the current output value of the optical transducer is equal to 0. Thus, the adjustment can be rapidly completed.

The gain balance value is represented by Kc, and is obtained by making use of the two predetermined external gains Kb1 and Kb2, the current output values M1 and M2 measured when the reflection spot is adjusted toward one side, and the current output values N1 and N2 measured when the reflection spot is adjusted toward the other side with respect to the following equation:

$$Kc = \frac{Y*Kb1 - X*Kb2}{X - Y},$$

wherein X=M1−N1, and Y=M2−N2.

The invention will become apparent from the following detailed description of the preferred but non-limiting embodiments. The following description is made with reference to the accompanying drawings.

DETAILED DESCRIPTION OF THE INVENTION

Figure 1:
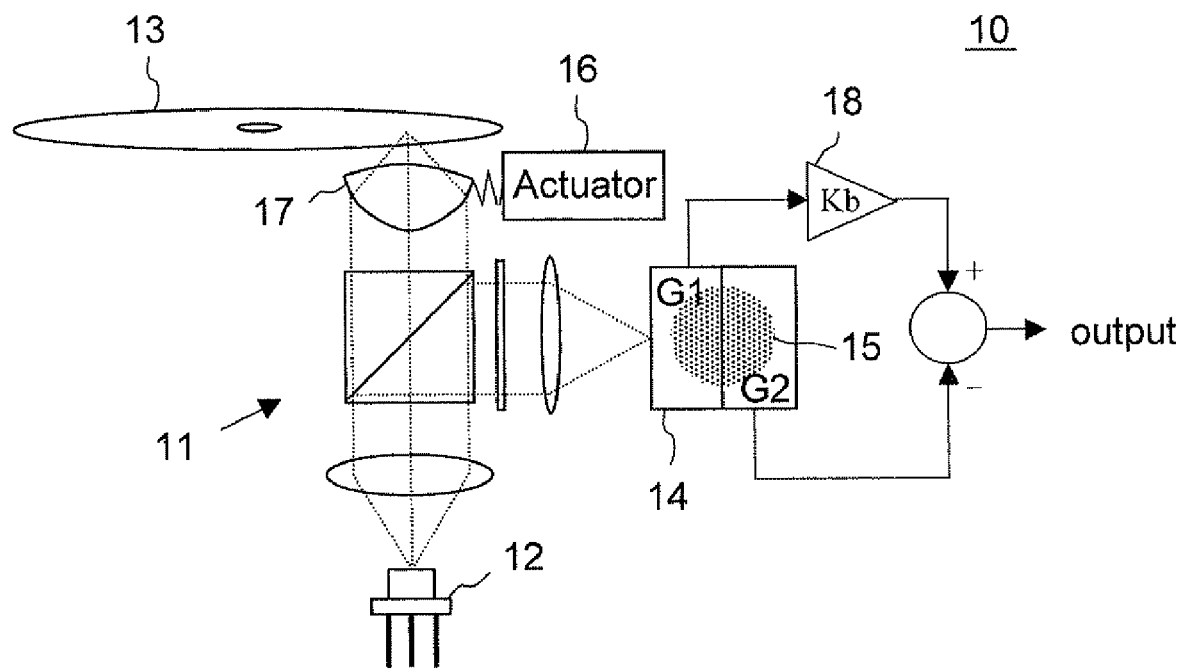
FIG. 1 (Prior Art) is a functional schematic illustration showing the conventional gain balance adjustment of an optical transducer.
Figure 2:
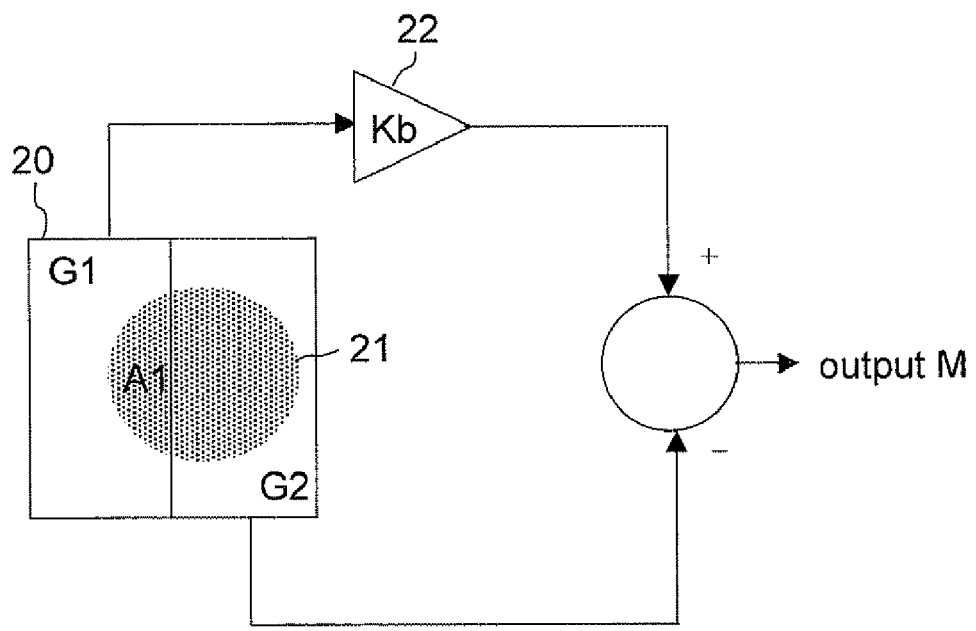
FIG. 2 is a schematic illustration showing that a reflection spot is adjusted toward a right side according to the invention.
Figure 3:
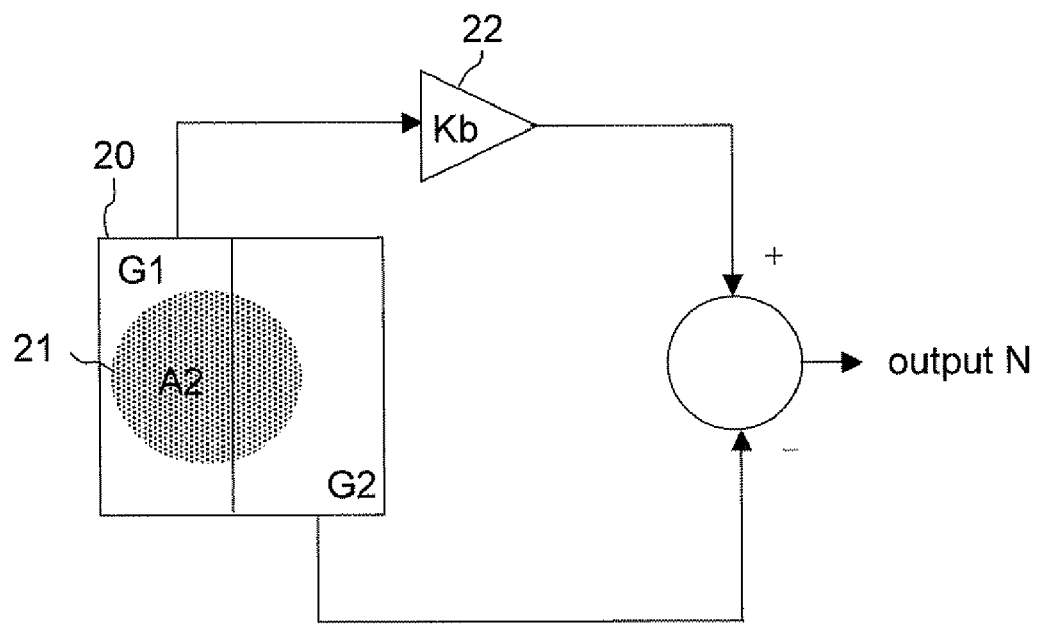
FIG. 3 is a schematic illustration showing that the reflection spot is adjusted toward a left side according to the invention.
Figure 4:
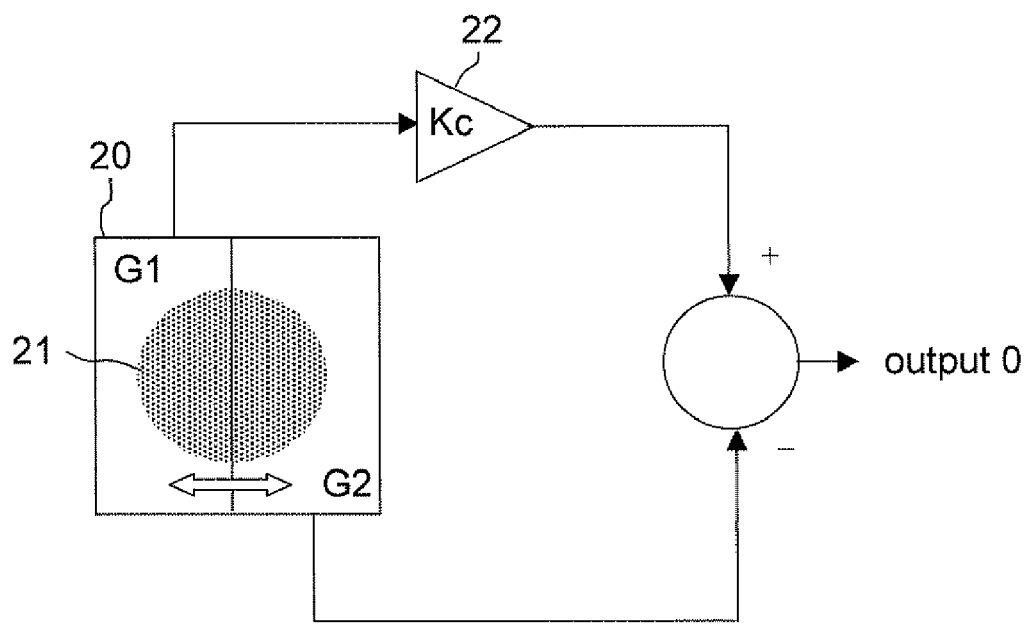
FIG. 4 is a schematic illustration showing that the reflection spot is adjusted to a balance position according to the invention.

FIGS. 2 to 4 show procedures of adjusting gain balance of an optical transducer 20 according to the invention. FIG. 2 shows a state, wherein a reflection spot 21 is adjusted toward a right side. FIG. 3 shows a state, wherein the reflection spot 21 is adjusted toward a left side. FIG. 4 shows a state, wherein the reflection spot 21 is adjusted to a balance position. The optical transducer 20 of the invention is divided into left and right half portions, which have the same size and respectively have gains G1 and G2. The optical transducer 20 is connected to an external gain modulation device 22, which predetermines two external gains Kb1 and Kb2. When an optical drive is not in the track-on closed loop control, a laser beam is focused on an optical disk in the invention. The optical disk reflects the laser beam so that the reflection spot 21 is projected on the optical transducer 20. Then, the reflection spot 21 is adjusted toward one side of the optical transducer 20. Similar to the conventional optical drive which utilizes an actuator to move the reflection spot, when we provide a positive bias to control the actuator, the actuator pushes the objective lens to move toward one side so that the reflection spot 21 is moved toward one side of the optical transducer 20. On the contrary, when we provide a negative bias, the reflection spot 21 is moved toward the other side of the optical transducer 20. Which sides the positive bias or the negative bias causes the reflection spot 21 move toward is determined according to the design of the polarity of the actuator.

As shown in FIG. 2, in this invention the reflection spot 21 is firstly adjusted toward, without limitation to, the right side of the optical transducer 20. When the reflection spot 21 is adjusted toward the right side, the reflection spot 21 is projected on the left and right half portions of the optical transducer 20 with different light receiving areas. It is assumed that the overall light receiving area of the reflection spot 21 is defined as Q, the light receiving area on the left side portion of the optical transducer 20 is defined as A1, and the light receiving area on the right side portion of the optical transducer 20 is (Q−A1). The current converting ratio per unit light receiving area is defined as T. Because the current converted by the optical transducer 20 have its level being proportional to the light receiving area, the current output values M1 and M2, which can be obtained by way of subtracting the current signals of the two halves portions of the optical transducer 14 from each other, may be obtained by making use of the predetermined external gains Kb1 and Kb2 with respect to the following equations, respectively:

$$T*A1*G1*Kb1-T(Q-A1)*G2=M1 \quad (1)$$

$$T*A1*G1*Kb2-T(Q-A1)*G2=M2 \quad (2)$$

Next, as shown in FIG. 3, the reflection spot 21 is adjusted toward the left side in this invention. It is assumed that the light receiving area on the left side portion of the optical transducer 20 is defined as A2, and the light receiving area on the right side portion of the optical transducer 20 is (Q−A2). The current output values N1 and N2 may be obtained by making use of the external gains Kb1 and Kb2 with respect to the following equations, respectively:

$$T*A2*G1*Kb1-T(Q-A2)*G2=N1 \quad (3)$$

$$T*A2*G1*Kb2-T(Q-A2)*G2=N2 \quad (4)$$

The current output value differences X and Y may be obtained by subtracting equation (3) from equation (1), and by subtracting equation (4) from equation (2), respectively, which is shown as follows:

$$(A1-A2)*T*G1*Kb1+(A1-A2)T*G2=M1-N1=X \quad (5)$$

$$(A1-A2)*T*G1*Kb2+(A1-A2)T*G2=M2-N2=Y \quad (6)$$

Than, equation (7) may be obtained by dividing equation (5) by equation (6), which is shown as follows:

$$\frac{G1*Kb1 + G2}{G1*Kb2 + G2} = \frac{X}{Y} \quad (7)$$

Equation (7) may be rearranged to obtain the ratio of the gain G1 to the gain G2 corresponding to the left and right half portions of the optical transducer 20, and the ratio is defined as a gain balance value Kc, which is shown as follows:

$$\frac{G2}{G1} = \frac{Y*Kb1 - X*Kb2}{X - Y} = Kc \quad (8)$$

This gain balance value Kc satisfies with the requirement of G1*Kc=G2. That is, when the reflection spot 21 is projected on the middle of the optical transducer 20, the left and right light receiving areas are the same Thus, after the signals, outputted from the left and right half portions of the optical transducer 20, are gained by the gain balance value Kc of the external gain modulation device 22, the output value, obtained after the gained signals are subtracted from each other, will be equal to 0, and the gain balance may be achieved.

In equation (8), the two external gains Kb1 and Kb2 are the known and predefined values in the external gain modulation device 22, and the current output value differences X and Y are the differences between two sets of current output values M1 and M2, N1 and N2, each is measured with respect to the external gains Kb1 and Kb2 when the reflection spot 21 is projected toward a corresponding side. That is, X=M1−N1 and Y=M2−N2 may be directly obtained or measured without being influenced by whether the reflection spot is adjusted to the middle of the optical transducer or by the gain circuit difference. Thus, the gain balance value Kc of the optical transducer 20 can be rapidly calculated.

As shown in FIG. 4, the external gain of the external gain modulation device 22 of this invention is firstly set to the gain balance value Kc. Then, the projection position of the reflection spot 21 is adjusted leftwards or rightwards to make the output value, which is obtained by subtracting two half currents of the optical transducer 20 from each other, be equal to 0, as indicated by the arrows in the drawing. When the output value is locked at 0, it is possible to ensure that the reflection spot 21 can be projected on the middle of the optical transducer 20, so that the optical transducer 20 can be rapidly adjusted to the correct gain balance.

Figure 5:
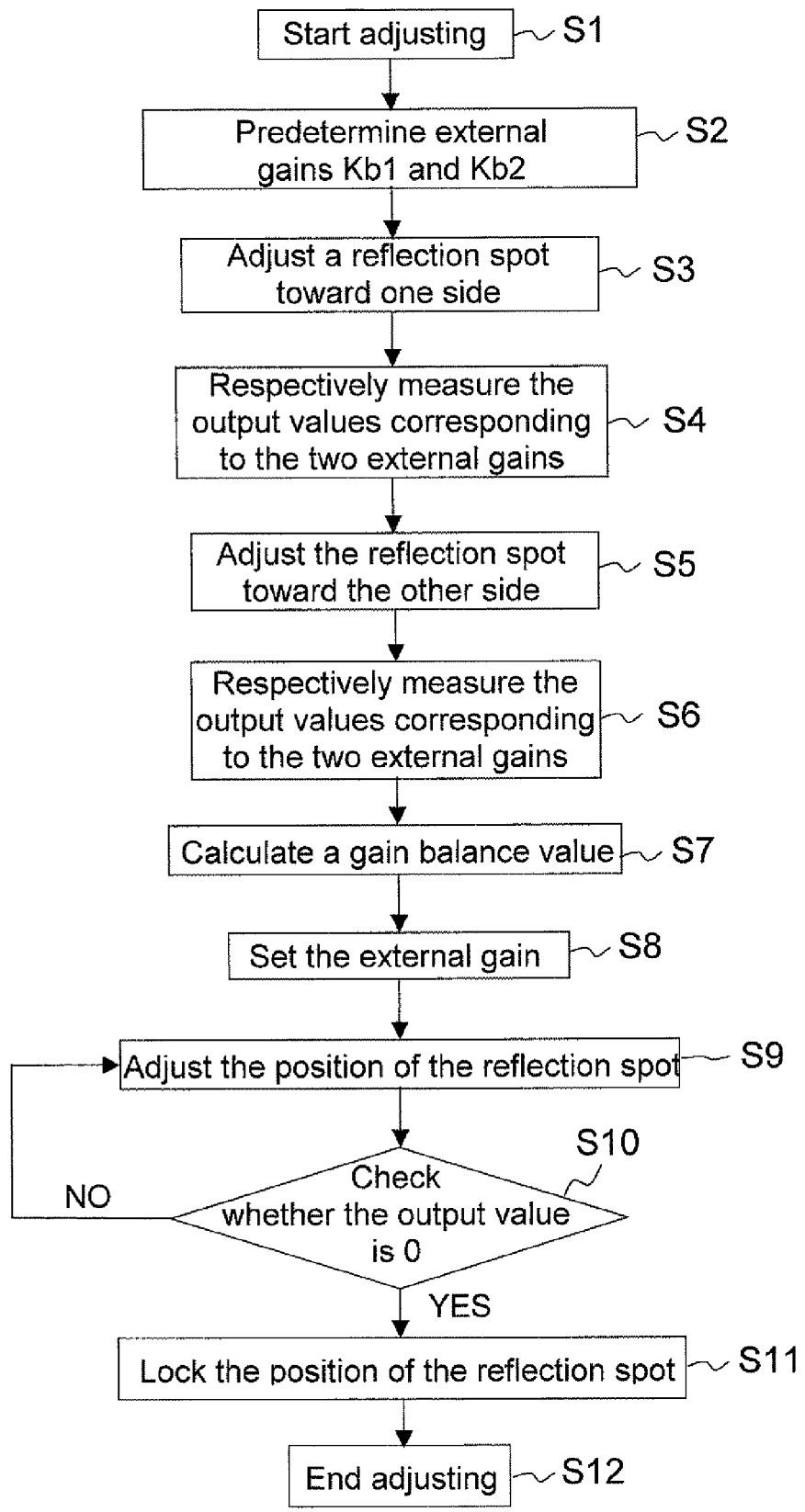
FIG. 5 is a flow chart showing a method of adjusting gain balance of an optical transducer according to the invention.

FIG. 5 is a flow chart showing a method of adjusting gain balance of an optical transducer according to the invention. The detailed steps of adjusting the gain balance by moving the reflection spot toward one side and calculating the correct external gain of the optical transducer will be described in the following. First, in step S1, the invention starts to perform the gain balance adjustment of the optical transducer when the optical drive is not in the track-on closed loop control. In step S2, two external gains Kb1 and Kb2 are predetermined for the external gain modulation device. In step S3, the projection position of the reflection spot is adjusted toward one side of optical transducer In step S4, the current output values M corresponding to the external gains Kb1 and Kb2 are respectively measured. Then, in step S5, the projection position of the reflection spot is adjusted toward the other side of the optical transducer. In step S6, the current output values N corresponding to the external gains Kb1 and Kb2 are respectively measured. Next, in step S7, the current output values, which correspond to the external gains Kb1 and Kb2 measured in steps S4 and S6, are substituted into equation (8) so as to calculate the specific gain balance value Kc of the optical transducer.

Next, in step S8, the external gain of the external gain modulation device is set as the gain balance value Kc. In step S9, the position, where the reflection spot is projected on the optical transducer, is adjusted leftwards and rightwards to make the output value, which is obtained by subtracting two half currents of the optical transducer from each other, be equal to 0. In step S10, it is checked whether the output value is equal to 0. If the output value is not equal to 0, the procedure goes back to step S9 to continue adjusting the projection position of the reflection spot. If the output value is equal to 0, the procedure enters step S11 to hold the projection position of the reflection spot and thus to ensure that the reflection spot can be projected on the middle of the optical transducer. Then, the procedure enters step S12 to end the gain balance adjustment.

Consequently, the method of adjusting the gain balance of the optical transducer according to the invention has the following advantages. The method can be performed without the need of adjusting the projection position of the reflection spot on the optical transducer, and without being influenced by whether the reflection spot is adjusted to be projected the middle of the optical transducer or by the gain circuit difference. The method may rapidly and correctly calculate the specific gain balance value of the optical transducer directly according to the predetermined values or the output values being measured. Then, the method can rapidly adjust the reflection spot to be projected on the middle of the optical transducer according to the calculated gain balance value of the optical transducer, so that the time of adjusting the gain balance can be shortened. Meanwhile, because the reflection spot correctly can be projected on the middle of the optical transducer, the method ensures that the optical drive can obtain the optimum signal quality and reliability at operating according to the variation of optical signal difference detected by the symmetrical half portions of the optical transducer.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of adjusting gain balance of an optical transducer in an optical drive, the method comprising the steps of:
    (a) predetermining two external gains;
    (b) adjusting the projection position of a reflection spot toward one side of the optical transducer, and respectively measuring the current output values of the optical transducer each corresponding to one of the external gains;
    (c) adjusting the projection position of the reflection spot toward the other side of the optical transducer, and respectively measuring the current output values of the optical transducer each corresponding to one of the external gains;
    (d) calculating a gain balance value of the optical transducer and setting the gain balance value as the external gain;
    (e) adjusting the projection position of the reflection spot which is projected on the optical transducer;
    (f) locking the projection position of the reflection spot when the current output value of the optical transducer is equal to 0; and
    (g) ending adjustment.

2. The method according to claim 1, wherein the method is performed when the optical drive is not in track-on closed loop control.

3. The method according to claim 1, wherein the gain balance value is represented by Kc, and is obtained by making use of the two predetermined external gains represented by Kb1 and Kb2, the current output values M1 and M2 measured in the step (b), and the current output values N1 and N2 measured in the step (c) with respect to the following equation:

$$Kc = \frac{Y*Kb1 - X*Kb2}{X - Y},$$

wherein X=M1−N1, and Y=M2−N2.

4. The method according to claim 1, wherein the step (b) adjusts the projection position of the reflection spot toward a right side of the optical transducer, and the step (c) adjusts the projection position of the reflection spot toward a left side of the optical transducer.

5. The method according to claim 4, wherein the step (e) adjusts the projection position leftwards or rightwards to make an output value which is obtained by subtracting two half currents of the optical transducer from each other be equal to 0.

6. The method according to claim 1, after the step (e) of adjusting the projection position of the reflection spot which is projected on the optical transducer, further comprising:

the step (e1) of checking whether the current output value of the optical transducer is equal to 0, and returning to step (e) if the current output value of the optical transducer is not equal to 0, or proceeding to the step (f) if the current output value of the optical transducer is equal to 0.

* * * * *